L. A. PARRE.
VALVE FOR HOT WATER HEATING SYSTEMS.
APPLICATION FILED AUG. 5, 1910.
1,044,234.
Patented Nov. 12, 1912.
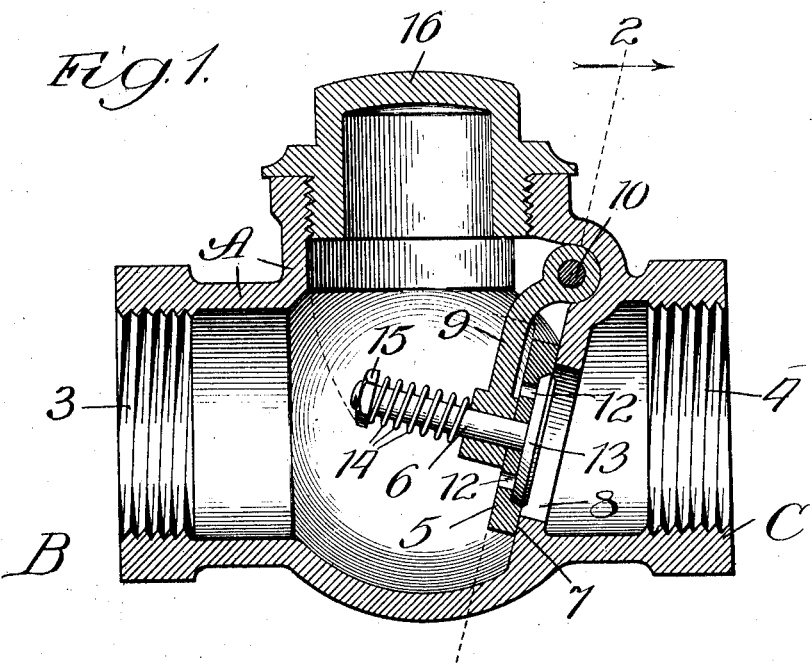
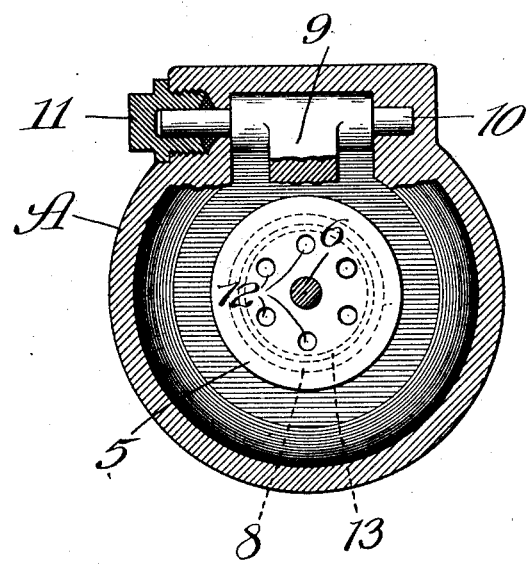
Witnesses.
Inventor,
Louie A. Parre,
By L. B. Coupland,
Atty.

UNITED STATES PATENT OFFICE.

LOUIE A. PARRE, OF BATAVIA, ILLINOIS.

VALVE FOR HOT-WATER HEATING SYSTEMS.

1,044,234. Specification of Letters Patent. Patented Nov. 12, 1912.

Application filed August 5, 1910. Serial No. 575,807.

*To all whom it may concern:*

Be it known that I, LOUIE A. PARRE, a citizen of the United States, residing at Batavia, in the county of Kane and State of Illinois, have invented certain new and useful Improvements in Valves for Hot-Water Heating Systems, of which the following is a specification.

This invention relates to a valve device for use in connection with hot-water heating systems, and has for its principal object to provide a simple, positive and efficient device for automatically increasing the circulation and refilling the system and confining the pressure within certain limits.

To this end the invention comprises what may be termed a double valve device which may be located in the pipe-system between the generator or heater and expansion tank.

Figure 1 is a vertical longitudinal section of a valve device embodying the improved features. Fig. 2 is a vertical transverse section on angular line 2, Fig. 1.

A represents the valve casing having threaded ends 3 and 4 for making the proper threaded connection in the pipe-system.

B will represent the generator or system side connection and C the expansion tank side.

The main disk-valve 5 is loosely mounted on a valve-stem 6 and closes against a valve-seat 7 formed in the casing A and having a circulating passage 8 therethrough. The upper end of a rocking arm 9 is mounted on a pivot bearing-pin 10 which is held loosely in place. The inner end of pin 10 has a bearing in the adjacent wall of the casing, the outer end being inserted in a removable plug 11, as best shown in Fig. 2. By removing the plug 11 the pin 10 may be slipped out and the arm 9 released which together with the other valve-parts may be removed from the casing. The lower end of supporting and rocking-arm 9 is loose on valve-stem 6 and bears against valve 5 and acts to retain the same in its proper working position. Valve 5 is provided with a number of port-apertures 12, and together with its seat is set at an inclination with reference to a straight line through the casing connection, so that valve 5 will gravitate to its closed position under normal conditions. An auxiliary valve 13 is rigidly mounted on the inner end of valve stem 6 and is of a less diameter than the valve-seat so as to work therethrough in its opening and closing movement. The valve 13 seats against valve 5 and closes the ports 12 therein when the pressure is the greatest from the expansion side.

A spring 14 is coiled on the valve-stem 6 between the arm 9 and a tension adjusting nut 15 threaded on the free end of the valve-stem. By a proper manipulation of nut 15 the tension of spring 14 is diminished or increased in varying the pressure at which the auxiliary valve will open.

When the pressure has reached a certain point in practical working, the auxiliary valve will automatically open against the remaining tension of spring 14 and uncover the port-apertures in the main valve through which the circulating medium will flow to the expansion tank, and will close at the proper time in maintaining the required circulation. With the opening and closing movement of the auxiliary valve, the valve stem has a corresponding endwise movement, the main valve and rocking arm 9 remaining stationary.

When the pressure goes down below a certain point the main valve will open and the system will be refilled from the expansion tank.

Convenient access may be had to the valve chamber in the casing by removing the screw-cap 16 when it is necessary to install or remove the valve-parts.

This valve device is not only adapted for use in connection with heating systems, but may be used in the circulating cooling system of automobiles.

This improvement presents a valve arrangement that is very sensitive and positive in operation and acts quickly in maintaining proper working conditions.

Having thus described my invention, what I claim is:

1. A valve-device of the class described, comprising a casing having a valve-seat formed therein, a main-valve provided with a number of port-apertures therethrough and positioned to close against said seat, a valve-stem on which said valve is loosely mounted, said stem having an independent endwise movement therefrom, an auxiliary valve rigidly mounted on one end of said stem and back-seating against the main-valve means for yieldably holding said auxiliary valve in its closed position, and means connected to the valve-casing for supporting said stem in its working position.

2. A valve-device of the class described, comprising a casing having a valve-seat formed therein, a main valve provided with port-apertures and in position to close against said seat, a valve-stem on which said valve is loosely mounted, an auxiliary valve rigidly mounted on said stem and having an independent movement toward and away from the main-valve in covering and uncovering the apertures therein, means for yieldably retaining said auxiliary valve normally seated against the main valve, and a rocking-arm pivotally mounted on said casing and loosely supporting said stem in its working position.

3. In a valve-device of the class described, the combination with a valve-casing having a valve-seat formed therein, of a main-valve provided with a number of apertures and closing against said seat, a stem on which said valve is loosely mounted, an auxiliary valve rigid on said stem, and back-seating against the main-valve, a supporting rocking-arm one end of which is pivoted to the casing and the opposite end in loose engagement with said stem, and a spring compressed between the free end of said stem and the connecting end of the rocking-arm.

In testimony whereof I affix my signature in presence of two witnesses.

LOUIE A. PARRE.

Witnesses:
 A. D. STANWOOD,
 G. E. CHURCH.